(12) United States Patent
Britsch et al.

(10) Patent No.: US 9,135,018 B2
(45) Date of Patent: Sep. 15, 2015

(54) COMPUTER CLUSTER AND METHOD FOR PROVIDING A DISASTER RECOVERY FUNCTIONALITY FOR A COMPUTER CLUSTER

(75) Inventors: Matthias Britsch, Koenigswinter (DE); Georg Fuchs, Rheinbach (DE); Colin Hirsch, Perugia (IT); Andreas Florath, Aachen (DE); Ralf Hager, Wachtberg-Pach (DE)

(73) Assignee: DEUTSCHE TELEKOM AG, Bonn (DE)

( * ) Notice: Subject to any disclaimer, the term of this patent is extended or adjusted under 35 U.S.C. 154(b) by 384 days.

(21) Appl. No.: 13/515,022

(22) PCT Filed: Dec. 10, 2010

(86) PCT No.: PCT/EP2010/007522
§ 371 (c)(1),
(2), (4) Date: Aug. 21, 2012

(87) PCT Pub. No.: WO2011/069664
PCT Pub. Date: Jun. 16, 2011

(65) Prior Publication Data
US 2013/0007741 A1 Jan. 3, 2013

Related U.S. Application Data

(60) Provisional application No. 61/285,737, filed on Dec. 11, 2009.

(30) Foreign Application Priority Data

Dec. 11, 2009 (EP) .................................... 09015371

(51) Int. Cl.
*G06F 9/455* (2006.01)
*G06F 9/44* (2006.01)
(Continued)

(52) U.S. Cl.
CPC .......... *G06F 9/4401* (2013.01); *G06F 9/45558* (2013.01); *G06F 11/203* (2013.01);
(Continued)

(58) Field of Classification Search
None
See application file for complete search history.

(56) References Cited

U.S. PATENT DOCUMENTS 6,032,184 A * 2/2000 Cogger et al. ................ 709/223
6,199,179 B1 3/2001 Kauffman
(Continued)

FOREIGN PATENT DOCUMENTS

EP 1909176 A1 4/2008

OTHER PUBLICATIONS

European Patent Office, International Search Report in International Patent Application No. PCT/EP2010/007523 (Apr. 29, 2011).
(Continued)

*Primary Examiner* — Sisley Kim
(74) *Attorney, Agent, or Firm* — Leydig, Voit & Mayer, Ltd.

(57) ABSTRACT

A computer cluster includes: a first compartment, further including a plurality of first physical nodes configured to provide first resources for a first infrastructural virtual instance and second resources for guest virtual instances; and a second compartment, further including a plurality of second physical nodes configured to provide third resources for a second infrastructural virtual instance and fourth resources for guest virtual instances. Each of the plurality of physical nodes further includes a mass storage device, the mass storage device further including: a partition provided for booting the physical node; a partition as part of resources assigned to an infrastructural virtual instance; and a partition as part of other resources. The first infrastructural virtual instance and the second infrastructural virtual instance are configured for monitoring each other.

11 Claims, 3 Drawing Sheets

(51) Int. Cl.
  *G06F 11/20* (2006.01)
  *H04L 29/08* (2006.01)
  *H04L 29/14* (2006.01)

(52) U.S. Cl.
  CPC ... *G06F11/2038* (2013.01); *G06F 2009/45575* (2013.01); *G06F 2009/45591* (2013.01); *G06F 2009/45595* (2013.01); *H04L 67/10* (2013.01); *H04L 69/40* (2013.01)

(56) References Cited

U.S. PATENT DOCUMENTS

| | | | |
|---|---|---|---|
| 7,213,246 | B1 | 5/2007 | Van Rietschote et al. |
| 7,448,079 | B2 | 11/2008 | Tremain |
| 2002/0069369 | A1 | 6/2002 | Tremain |
| 2003/0172145 | A1* | 9/2003 | Nguyen ............... 709/223 |
| 2006/0294337 | A1* | 12/2006 | Hartung et al. ........ 711/173 |
| 2008/0104608 | A1 | 5/2008 | Hyser et al. |
| 2008/0209016 | A1 | 8/2008 | Karve et al. |
| 2009/0216910 | A1 | 8/2009 | Duchesneau |
| 2009/0276771 | A1 | 11/2009 | Nickolov et al. |
| 2010/0058342 | A1 | 3/2010 | Machida |
| 2010/0275204 | A1 | 10/2010 | Kamura et al. |
| 2011/0125894 | A1* | 5/2011 | Anderson et al. ...... 709/224 |
| 2011/0126197 | A1* | 5/2011 | Larsen et al. ............ 718/1 |

OTHER PUBLICATIONS

European Patent Office, International Search Report in International Patent Application No. PCT/EP2010/007522 (Apr. 29, 2011).
Disk Partitioning, Wikipedia, Dec. 5, 2010.

* cited by examiner

COMPUTER CLUSTER AND METHOD FOR PROVIDING A DISASTER RECOVERY FUNCTIONALITY FOR A COMPUTER CLUSTER

CROSS-REFERENCE TO RELATED APPLICATIONS

This patent application is a national stage entry under 35 U.S.C. §371 of International Application No. PCT/EP2010/007522, filed Dec. 10, 2010, and claims priority to European Patent Application No. EP 09015371.9, filed Dec. 11, 2009, and U.S. Provisional Patent Application No. 61/285,737, filed Dec. 11, 2009. The International Application was published in English on Jun. 16, 2011, as WO 2011/069664 A1.

FIELD

The present invention relates to a computer cluster and a method for providing a disaster recovery functionality for a computer cluster

BACKGROUND

An example of conventional computer clusters is described e.g. in U.S. Pat. No. 7,448,079 B2.

Hosting of server based applications is a core element and its business model is built around an economy of scale effect with regards to specializing in the operation of server hardware, networks or applications. Specialized departments or whole companies manage these assets for customers in number of tens of thousands of hardware hosts or applications and tens or hundreds of networks. Their mass service offerings presume that either hardware or applications are provided to the customer. In certain cases virtual machines are offered with a restricted feature set. Both theory and best-practices comply with the rule that organizational interfaces are in optimal cases, built on external machine interfaces. Typically this is hardware, in a way that the hoster handles only hardware elements or an application interface. Access to machines is limited to specific cases. In certain instances standard offerings for virtual machine hosting are available, yet these machines have certain shortcomings, specifically that they are restricted to one and only one server. It is not possible for the customers to get customized network settings, dynamic resizing of their hosted resources, etc.

SUMMARY

In an embodiment, the present invention provides a computer cluster. The computer cluster includes: a first compartment including a plurality of first physical nodes configured to provide first resources for a first infrastructural virtual instance and second resources for guest virtual instances, each of the plurality of first physical further including a first mass storage device, the first mass storage device including: a first partition provided for booting the first physical node; a second partition as part of the first resources assigned to the first infrastructural virtual instance; and a third partition as part of the second resources; and a second compartment including a plurality of second physical nodes configured to provide third resources for a second infrastructural virtual instance and fourth resources for guest virtual instances, each of the plurality of second physical nodes including a second mass storage device, the second mass storage device including: a fourth partition provided for booting the second physical node; a fifth partition as part of the third resources assigned to the second infrastructural virtual instance; and a sixth partition as part of the fourth resources. The first infrastructural virtual instance and the second infrastructural virtual instance are configured for monitoring each other.

DETAILED DESCRIPTION

In an embodiment, the present invention provides a computer cluster having better performance, more reliability at lower hardware and/or operational costs than conventional solutions.

In an embodiment, a computer cluster is provided, wherein the computer cluster includes a first compartment and a second compartment, wherein the first compartment includes a plurality of first physical nodes, wherein the plurality of first physical nodes provide first resources for a first infrastructural virtual instance and second resources for guest virtual instances, wherein the second compartment includes a plurality of second physical nodes, wherein the plurality of second physical nodes provide third resources for a second infrastructural virtual instance and fourth resources for guest virtual instances, wherein each one of the plurality of first physical nodes includes a mass storage device including:

a first partition provided for booting the first physical node,
a second partition as part of the first resources assigned to the first infrastructural virtual instance and
a third partition as part of the second resources, wherein each one of the plurality of second physical nodes includes a mass storage device including:

a fourth partition provided for booting the second physical node,
a fifth partition as part of the third resources assigned to the second infrastructural virtual instance and
a sixth partition as part of the fourth resources, wherein the first infrastructural virtual instance and the second infrastructural virtual instance are configured for monitoring each other.

In an embodiment, it is advantageously possible to build a virtualized storage system with high reliability and high availability because of two redundant compartments and two infrastructural virtual instances (at least one infrastructural virtual instance in each compartment) are monitoring each other. Advantageously storage hardware changes (e.g. configuration changes) are executable without any negative impact to the second and fourth resources and to the guest virtual instances. Customers using the guest virtual instances will not notice that the hardware storage devices have undergone changes or have been inactive.

In an embodiment, an infrastructural virtual instance hosts one process or a plurality of processes implemented in a virtual instance, which is running on the same hypervisor as the application guests and used to manage underlying physical nodes. Administrative virtual instances host general management processes, while infrastructural virtual instances host processes managing underlying physical storage nodes and providing redundancy mechanisms and data consistency for the physical storage nodes.

In an embodiment, the virtualized infrastructural instances are connected in a master and slave relationship, wherein in case that both the first infrastructural virtual instance and the second infrastructural virtual instance are operational, one of the first infrastructural virtual instance and the second infrastructural virtual instance acts as a master virtual device and the other acts as a slave virtual device, and in case that the master virtual device fails the slave virtual device becomes the master, and in case that only one of the first infrastructural virtual instance and the second infrastructural virtual instance is operational, then the operational infrastructural virtual instance is the master virtual device and the other infrastructural virtual instance is activated and becomes the slave virtual device.

In an embodiment, the plurality of third partitions and the first infrastructural virtual instance are connected in a first storage network and wherein the plurality of sixth partitions and the second infrastructural virtual instance are connected in a second storage network. These storage networks are preferably at least one out of the following: iSCSI networks, networks using the Transmission Control Protocol/Internet Protocol (TCP/IP) or Network Block Devices.

In an embodiment, the first compartment includes a first militarized zone and a first demilitarized zone, wherein the second compartment includes a second militarized zone and a second demilitarized zone, wherein in the first militarized zone only a restricted data exchange compared to the first demilitarized zone is allowed, wherein in the second militarized zone only a restricted data exchange compared to the second demilitarized zone is allowed, wherein each first physical node in the first militarized zone includes a seventh partition as part of fifth resources for a first administrative virtual instance, wherein each second physical node in the second militarized zone includes an eighth partition as part of sixth resources for a second administrative virtual instance.

In an embodiment, the plurality of second partitions are connected in a RAID1 system and the plurality of fifth partitions are connected in a further RAID1 system. In RAID1 (mirroring without parity or striping), data is written identically to multiple partitions (a "mirrored set"). The system advantageously provides fault tolerance from partition errors or failures and continues to operate as long as at least one partition in the mirrored set is functioning.

In an embodiment, the second resources and the fourth resources are provided for at least one telecommunication application.

In an embodiment, the first infrastructural virtual instance and the second infrastructural virtual instance provide disaster recovery means.

In an embodiment, the computer cluster includes a third compartment and a fourth compartment, wherein the third compartment includes a plurality of third physical nodes, wherein the plurality of third physical nodes provide seventh resources for a third infrastructural virtual instance and eighth resources for guest virtual instances, wherein the fourth compartment includes a plurality of fourth physical nodes, wherein the plurality of fourth physical nodes provide ninth resources for a fourth infrastructural virtual instance and tenth resources for guest virtual instances, wherein the third infrastructural virtual instance and the fourth infrastructural virtual instance are configured for monitoring each other. Therefore it is advantageously possible to provide a plurality of pairs of redundant compartments.

In an embodiment, a method is provided for providing a disaster recovery functionality for a computer cluster, wherein
in case that both the first infrastructural virtual instance and the second infrastructural virtual instance are operational, one of the first infrastructural virtual instance and the second infrastructural virtual instance acts as a master virtual device and the other acts as a slave virtual device, and in case that the master virtual device fails the slave virtual device becomes the master, and
in case that only one of the first infrastructural virtual instance and the second infrastructural virtual instance is operational, then the operational infrastructural virtual instance is the master virtual device and the other infrastructural virtual instance is activated and becomes the slave virtual device.

In an embodiment,
in case that both the first administrative virtual instance and the second administrative virtual instance are operational, one of the first administrative virtual instance and the second administrative virtual instance acts as a master virtual device and the other acts as a slave virtual device, and in case that the master virtual device fails the slave virtual device becomes the master, and
in case that only one of the first administrative virtual instance and the second administrative virtual instance is operational, then the operational administrative virtual instance is the master virtual device and the other administrative virtual instance is activated and becomes the slave virtual device.

In an embodiment, a computer cluster is provided for providing hosting services, including:
a plurality of nodes, the nodes being responsive to administrative requests; and
each node including a virtual instance such that each virtual instance responds to user requests and appears to the user as having its own operating system,
wherein any virtual instance shares the resources of the node.

In an embodiment, the computer cluster includes a virtualized management system for managing the virtual instances.

In an embodiment, it is advantageously possible that all these resources are managed in an integrated way. Thus, redundancy, resource changes, configuration changes and all other operational processes on platform layer can be in responsibility of the hoster and are executed without any impact to the customers' virtual machines and/or operational processes. The customer will not notice that operational processes, impacting hardware producing his resources have undergone changes.

In an embodiment, a method is provided for providing hosting services including:
forming a computer cluster from a plurality of nodes;
establishing a control system for coordinating functions of the nodes; and
operating at least one virtual instance on each node, such that each virtual instance responds to user requests;
providing an operating system virtualization means for controlling the virtual instances.

Virtualized Management System for Virtual Platforms

In an embodiment, it is possible to provide a management system. In virtualized environments, different hardware hosts (in the following hardware hosts, hardware servers or hosts are also called physical nodes) can be used to host the same applications, thus, capacity resources can in principle be used to provide spare redundancy. In case a specific physical node fails, the virtual machines (in the following virtual machines are also called virtual instances) hosted on it can be restarted on another hardware host. The boot device is not bound to specific hardware.

Yet this requires that the platform is able to boot and run also in case other hardware platforms fail and it requires a management system which is able to run inside a virtual machine inside the cluster it manages. Both management system and platform are required to provide a certain set of functionality to realize these features.

All hardware hosts are equipped with hard drives and the control domains of the virtualization solution or the virtualization solution itself boots from the local drives. This local storage is not used for guest servers. Guest servers are connected to external storage. Thus, all hosts are able to boot, even in case of losses of external storage, i.e. all hosts are able to boot independently from external storage.

All functions relevant for the guest systems, such as
  guest server configuration files
  DHCP, DNS, etc. server configuration files
  TFTP and DHCP servers required for booting of guest servers
are hosted on the control domain and are using data stored on the local HDD of the control domain. The control domain includes a communication system to contact other control domains and exchange the necessary data. Communication controls system wide write locks in case data is changed.

The communication system distributes all configuration data over all control domains in the platform and ensures consistency at any given point in time. This requires all communication to take place in acknowledged mode and all operations to be transaction based. All changes created by the management system are distributed by the underlying mechanism in a way the management system is not even aware that the data is stored in a distributed way.

To perform the required operations in case of failure of parts of the platform, each control domain requires an infrastructural system embedded into the control domain. The infrastructural system has to be able to select and execute specific profiles, depending on environment triggers. Normal operation tasks will be executed by the general management system, the infrastructural system will primarily act in cases of disaster, during reboot of the local control domain or parts of the platform (e.g. after failure of fire compartment or site) or in the wake of hardware faults. Examples for such rules are:
  If the host (in the following also called physical node) boots and no other control domain can be contacted (handshake), just start all local infrastructure resources (e.g. TFTP servers, DHCP server, DNS server, storage server, etc) and wait for manual intervention by the operator
  If the host boots and more than 50% of the servers can be contacted (handshake) and the local control domain is configured to run global management system (component 1) with the highest priority of all contacted nodes, start all infrastructure resources and start management system
  In case the host boots and less than 50% of all other servers can be contacted (handshake) and the external interface of the other servers cannot be reached and the quorum devices of these servers are not reachable, start all infrastructure resources and the management system
  In case the host boots and more than 90% of all other machines are available and the global management system is running, just boot the infrastructure resources and wait for the management system to make use of the control domains resources The global management system has to cope with the fact that it is managing virtual platforms on hosts, but all actions can impact the own host as it is running on a host as well. The management system thus has to be aware on which host it is running. This information is accessible from the configuration files of the control domains. All rules and manual actions performed by and with the management system have to be checked with a generic rule for impact on the own platform.

The management system has to be able to run inside a virtual machine. This can be achieved easily by complying with common implementation standards (e.g. not using processors calls directly from the application or using real-time operating systems).

The management system has to be able to operate on two different sets of data. One set of data is related to application servers, in this case virtual machines hosted on the platform. These machines can be handled as any other server, with all the data stored in a database handled by the management system.

The management system has to be able to handle data related to the control domain of the hardware hosts as well. Data related to the hosts has to be stored on the hosts, as the hosts have to be able to boot and subsequently start the management system which is required to run the virtual machines. This sequence requires the necessary data to be stored on the control domain, but managed by the management system. Thus the management system will implement an abstraction by integrating both sets of data into a meta-structure. For all operations on this data, the management system will apply transactions. A transaction shall not be considered to be finished until it is confirmed from all targets. In order to include all targets into the scope, the management system has to wait for transactions from all hardware hosts to be completed.

In case a standard management system should be used, the corresponding functions have to be implemented into an abstraction layer. This layer shall include the following functions:
  1) A list of all control domains and hardware hosts included in the system
  2) Filter engine which is able to check all operations, commands and file changes for relevance for the own hardware host. In case the own hardware host is addressed, the operation is to be stalled and either responded with a corresponding error case or an SNMP alert.
  3) Meta-data structure, which allows to manage two distinct sets of data in a way transparent to the application (the management system).
  4) Fetch commands from the operating system and sort them into two queues, one for application servers, one for control domains.
  5) All control domain queue operations are to be handled by a transaction machine
  6) All control domain queue operations have to be repeated for all control domains Impacted Components Dedicated network resources can be created by assigning VLAN and MPLS tunnels in a network to the connections of a specific customer, thus separating the customers' resources for his exclusive use and shield his traffic completely from any other customer. Standard Ethernet mechanisms, such as 802.1p extension and MPLS bandwidth management can be used to ensure availability of the assigned resources. In an embodiment, it is advantageously possible to:
  dynamically reconfigure control domains' network configurations create abstraction by use of virtual network bridges, e.g. termination mode: untag all VLANs create a management system spanning dedicated network devices (hardware switches) as well as software elements hosted both on general purpose hardware (e.g. firewalls) and on virtualized hardware Enhance control domains to make full use of the parameter ranges enabled by network protocols (e.g. 4096 virtual LANs per Ethernet interface)

In this context network configurations mean VLAN tags, network interfaces' IP addresses, static routes, binding to (virtual switches), termination mode (untag VLANs or not), name servers, default route, dhcp activation status and server address.

Servers need to be created in a way that they are connected exclusively to the networks assigned to the customer. The control domain has to be enhanced in order to allow access to hardware resource relevant information (e.g. boot output) in way that customers are not interfering with each other and access of each customer is restricted to his own information. Hardware related operational processes have to be possible without interference with operational tasks of the customer, in specific tasks related to the virtual servers, thus hardware resources have to be independent from specific hosts (this can be implemented based on live migration features of virtualization technology). In an embodiment, it is advantageously possible to Enable control domains' and virtual servers' to migrate even with full range of network setting parameters in use Enable initrd and initramfs to boot in a virtualized environment, with storage abstracted by network protocols (e.g. NPIV and iSCSI)

Enable operating systems (e.g. Linux) to boot via iSCSI in multipath mode

Storage resources have to be enabled for dynamic creation and resizing during operation in a way these changes do not interfere with availability or uptime of the virtual server to whom they are assigned. In the same way as virtual servers have to be independent and abstracted from the server hardware, storage resources have to be independent from specific hardware, paths and they have to be abstracted from operational processes related to storage and, if existing, storage networks. In an embodiment, it is advantageously possible to Enable storage to be accessed via network protocols in order to be able to cope with loss of paths or storage redundancy Create storage which is independent from access path Build abstraction layer by a double iSCSI stack, e.g.:
Host: LVM, multi-device, iSCSI initiator
Abstraction layer: iSCSI target, LVM, RAID, iSCSI initiator
Storage Layer: iSCSI target, optionally LVM, physical partition
This stack allows to use disks which are local to hosts in a way that they can still be part of a highly available platform and don't force to move data on specific hosts, which allows to make full use of all disk capacity, regardless of the server they are connected to The management system has to enable creation of all elements in the data center centrally as it has to maintain the configuration database out of one hand Management system multi-tenancy enabled. The customer has to be able to identify physical location of machines (rack and host awareness) as well in order to assign virtual machines to hosts, sites, racks, etc corresponding to the redundancy requirements of his applications. In an embodiment, it is advantageously possible to create a multi-tenancy enabled management system, which is able to run inside a virtual server instance which is hosted on the platform which it is managing. In case the management system is running outside the platform, redundancy of the platform is linked to redundancy of the external platform, thus implementation of the external management platform requires solution of exactly the same problem as for the production platform. This problems are solved by the present invention, thus the management system can be placed in a virtual platform and run on the highly available fault tolerant platform.

To be considered is a set of rules, e.g. the management system should not shut down its own host.

The platform has to be able to run without the management system, e.g. resume operations based on latest configuration The control domains have to be enabled to distribute configuration data The control platforms have to be enabled to evaluate configuration data The control platforms are required to manage the run status of all virtual platforms which are required to keep the management system up and running (in specific the storage stack and the virtual platform the management system itself is running in)

Create GUIs for all functionality in a way that average skilled operations staff can operate the platform and only troubleshooting requires expert knowledge Firewalls configured automatically in a way that the customer can control the flow of traffic to and from his systems, but not to others. The customer has to be able to identify physical location of machines (rack and host awareness) as well in order to build appropriate demilitarized zones and militarized zones (DMZ/MZ architectures). The physical nodes in the militarized zones include a plurality of seventh partitions as part of fifth resources and a eighth partitions as part of sixth resources for administrative virtual instances. In an embodiment, it is advantageously possible by providing these administrative virtual instances to Build an algorithm to centrally manage all security relevant settings and check for consistency Derive connectivity matrix from configuration parameters of virtual instances and automatic translation into firewall rules which are updated dynamically Enable automatic updating of all security settings, regardless of the instance in an service interruption free way Manage all accounts centrally Update account information to virtual instances based on central repository (e.g. SVN interface to management system)

The backbone connections have to be accessible for the customer, who has to be able to configure all relevant routing tables. In an embodiment, it is advantageously possible to Manage backbone networks routes centrally, integrated with the servers and the switch, VLAN, load balancer and firewall settings Store backbone networks configuration data centrally Create interfaces to relevant equipment (e.g. MPLS route reflection server)

This set of features enables a customer to configure and order a full fletched data center without manual interaction concerning hardware means on the provider side. All data can be entered in the corresponding GUIs and as soon as payment is guaranteed the customer can be informed, e.g. via mail or any other communication method about his access details (hostnames, usernames, passwords).

Application development currently includes the task to design and implement all redundancy relevant functionality, as redundancy functions are application aware. In case of virtualized environments, this can be changed. From the perspective of the virtual hardware (the resources managed by the hypervisor) all software components are equivalent entities, the operating system processes of the virtual machines. In order to provide hardware redundancy in a virtualized environment, details of the process architecture inside the virtual machine are not required.

The solution enables completely new business models, moving from Software as a Service (SaaS) to Virtual Server as a Service (VSaaS) to a yet undescribed offering "(virtual) Data Center as a Service" (vDCaaS).

Provisioning of Virtual Machines

Operational processes of server platforms are organised using layers. Layers include hardware, operating system, middle ware and application layer. Interfaces suited to build interfaces to external organisational units on them are available on application or on hardware layer. In an embodiment, it is advantageously possible to build a reliable abstracting interface between hardware resources and virtual machines.

In order to create a customer-provider interface between hardware and operating system all functions which are available to the machine's user (root account in Unix understanding) are required. In addition, they have to be abstracted from the underlying systems in a way that no mutual dependency or impact is created between different virtual machines and neither between virtual machines and the hosts.

Virtualization software (hypervisor) allows assigning hardware devices to specific virtual machines. Common console output is required for the user of the virtual machine to cope with potential issues around hardware assigned to the virtual machines they are operating.

Implementation requires a virtual console device inside the guest operating system and a virtual interface piping the output into a file on the control domain or another server. Customers can get access to this file by standard operating systems means, such as Linux/Unix file descriptors or remote access (e.g. ssh) providing limited access to only the relevant files.

Resources on hardware level have to be visible, in order to allow the users of virtual machines to run operational processes, such as capacity planning. This requires knowledge about actually available hardware resources, as measurement on virtual level does not give correct numbers. Access to information has to be restricted in a way that operators of specific virtual machines can access exclusively data relevant for their machines.

Information about assigned hardware resources is included in configuration files of the hypervisor. Security relevant access policies for these files can be realized by standard operating system file descriptors. Advanced features can be realized based on security enhanced systems (e.g. SELinux or B.1 certified Solaris). For more convenient access from the virtual machine, a virtual interface can be used which presents the hardware settings as virtual device inside one or more guest systems.

The behavior of virtual machines is in addition to hardware resources assigned to them, also defined by a broad range of configuration elements. These configuration elements depend on the type of virtual machine. An important example is the redundancy setting, which defines the restart behavior in case of failure.

A number of virtualization products do store history and other virtual machine relevant log and configuration data in databases or flat file systems in the control domain. Operational processes will require access or are granted access to this data.

The approach allows operating virtual machines in the same way as hardware servers.

Virtual High Availability and Disaster Recovery

In an embodiment, it is possible to use decoupling of storage and enable shifting of applications across geographically distributed sites.

In order to implement such a feature, the iSCSI target (the controller component) needs to have the following characteristics:

It has to expose its resources by industry standard iSCSI

It has to synchronize the status of all write commands between all paths. This can be done by over any network connection. The status has to be written for all portals in a portal group; on whatever node they may be hosted.

In order to do that, all iSCSI discover and login events have to be propagated to all controllers. This can be done by using password and policy files shared for each portal group, which are to be replicated to all nodes which host portals of a group.

All controllers need to be able to connect to all storage resources. This can be done by using any routable network connection, e.g. IP, FC or Infiniband.

A storage resource must be mounted in a write lock enabled way

Physical storage resources must provide the capability to be abstracted, one possible solution is to use a standard Unix operating system and use it's function, e.g. 1 vm Storage resources must provide the capability to be secured against failure of one or more components e.g. by using RAID1 systems or Reed-Solomon based replication All traffic on all external interfaces must provide the option to be encrypted All iSCSI functions must be available on the platform, but not necessarily on a specific interface Network layer mechanisms must be supported (e.g. VRRP, routing protocols, etc)

In an embodiment, it is advantageously possible to provide data redundancy by means of replication over arbitrary distances. Prerequisite for this solution is the availability of a multipath solution, e.g., by iSCSI, NPIV or e.g. of distributed block devices. Replication over arbitrary distances is currently hindered by the fact that a running storage host can cause changes in its storage at any given moment in time. Thus, replicating data to remote sites requires synchronous replication. This means that each storage status change is reported to the initiator, the storage host, only after the status change is committed by all replication instances. This decreases performance in case the distance to one or more replication instances causes increased signal round-trip-times.

In case a virtual machine is to be migrated to a distant host, there is no issue with regards to the virtual machine itself as migration is distant agnostic. The network has to be prepared for such an action, in terms of bandwidth. Yet, the storage has to be migrated in order to enable migration of the machine. This can be done using iSCSI multipath exclusively or implementing additional features in the storage node, enabling enhanced migration.

This procedure creates the following prerequisites and functions:

Create and implement the concept of "sites" which based on area in which synchronous replication mode is possible based on actual signal round-trip-time in management systems of servers, storage and network If IP connectivity redundancy scheme requires certain prerequisites or intervention, both manual or automated, implement the required mechanisms and triggers e.g. route settings, etc Implement in the format layer of the storage resources, e.g. file system or block device, a configuration possibility which is dynamically reconfigurable to switch all objects inside the resources from synchronous to asynchronous replication mode Implement the actual replication mechanism, e.g. snapshots, copy-on-write, manipulation of inode table or any other suited technology Implement an algorithm which controls the switch from asynchronous to synchronous replication mode and back based on evaluation and projection of server load and storage load Implement algorithm to trigger the IP redundancy mechanism Implement "storage ballooning". In detail, control the scheduler of the virtualization solution or the resource manager (depending on virtualization mode) of the storage host from the same source as the replication of data (and subsequent migration) is controlled in order to be able to decrease the processor cycles (or resources in general) until the performance of storage replication is high enough to advance in replication even if the machine is using up all (temporarily) assigned resources.

Hardware Awareness

Redundancy configurations have to be able to consider restrictions of the underlying hardware and topology, e.g. creation of redundancy areas considering buildings, sites, power supply areas, etc. Hardware names are supposed to be accessible by standard means (e.g. host names). Specifics of certain hardware types, e.g. availability of the hardware, have to be configured manually.

The solution has to consider physical distance of machines ("rack awareness") in order to allow storage of data as close as possible to the user. This information will be configured manually. Distances between configured groups of nodes are checked automatically and continuously by the system, based on round trip times of application handshakes.

The solution has to be able to configure the degree of redundancy separately for each object in a way that both the number of copies to be stored and the number of copies required for restoration of data can be configured separately (n:m redundancy). This setting will be done manually. A default will be used if no manual change is done.

In case the solution is implementing file systems, it has to be able to run higher layer formats, independent from the interface towards the host. This can be done creating software functionality that replaces loop mount functionality.

All elements of the solution have to be able to run in a virtualized environment. This can be ensured by using only appropriate coding schemes, e.g. not using system calls in case of native implementation or using run time environment technologies.

The solution has to provide the capability to find each data sniplet from each entry point. This will be done by labelling each sniplet with an identifier which includes all information required to link it to all other sniplets required to recreate that data in style of a multiple linked list.

The solution has to provide the capability to relocate each sniplet to each physical device. This will be done by using continuous monitoring of uptime and resource usage of nodes and apply optimisation algorithms to relocate and relabel sniplets in case a certain node uses an amount of it's resources exceeding preconfigured thresholds. This feature has to be abstracted from the hosts.

The solution has to be able to configure synchronous or asynchronous replication for each data object. This will enable time optimised handling of redundancy and preparation of e.g. migration of hosts to remote geographical location, as required data can be replicated largely in asynchronous mode, thus shortening the time frame in which the performance of the host is impacted by the round trip time increase of his storage operations. This will be implemented by using a flag in the data header that indicates if a data object or sniplet thereof is to be handled synchronous or asynchronous.

The solution has to consider transmission time delays in case of re-arranging or re-locating sniplets, while providing the capability for an "enforcement" of both modes even if not appropriate (e.g. in case synchronous mode is requested for copying active sniplets to a remote site, creating delays due to transmission delay, this can be required, however, to shift data in a way that follows the migration of a virtual machine). This will be implemented by using frequently performed access round trip time measurements for specific machines and listing them for all data sniplets belonging to one data object or data objects itself. The response time will be defined by the largest round trip time of the sniplets of one data object.

In case of failures of one or more nodes have the remaining nodes to be able to resume operation seamlessly with the remaining nodes and data objects or sniplets. This is achieved by keeping all relevant data on all concerned nodes in parallel. All data is to be stored, maintained and updated on all nodes which are storing data objects or sniplets which are relevant for this data.

Failure of a specific gateway shall not create any interruption in service, it merely leads to the fact that the failing node is deleted from the list of status synchronization targets. This is inherently included in the fact that all status changes are replicated to all concerned nodes internally before the corresponding response is sent to the host. Thus, the host can access the storage platform by any number of independent paths in parallel.

The solution has to provide the capability to take new nodes added to the system in operation fully automatic and seamlessly for any other node.

Resource and Redundancy Management in Virtualized Environments

Today's software clusters provide redundancy by controlling dependencies between hard and software and interdependencies between processes. Thus to provide redundancy, process architectures have to be modelled in the cluster configuration. The invention aims to provide redundancy on platform layer based on the availability of operating system processes or the state of the virtual servers.

From the perspective of the virtual hardware (the resources managed by the hypervisor) all software components are only one entity, the operating system processes of the virtual machines. In order to provide hardware redundancy in a virtualized environment, details of the process architecture inside the virtual machine are not required. However, managing this redundancy in a way that all hardware hosts can be considered spare capacity and thus spare redundancy for all virtual machines requires two distinct levels of control.

First the control domain hosted on each hardware host has to be able to act autonomously. (How this can be achieved is described in "Distributed Architecture based Management System for Control Domains" and "Autonomy of virtualized Hosts"). Second, the management system running the overall platform has to be able to cope with the specific environment. This includes some specifics, most important are that it has to be aware that it is running inside a virtual machine in order to prevent it from creating a deadlock for itself and that it has to be able to integrate two sets of data (the infrastructure, control domain plus infrastructure guest and the application guests) into a combined view.

However, in order to make full use of all possible redundancy configurations, the management system has to be able to work with a set of settings (which will be executed by the control domains' resource managers) which considers not only a fixed assignment between active and spare capacity, but also their location and their grouping.

The principle is as follows:

A matrix of classification parameters for all resources is formed.

- Classes of resources are created according to the type of hardware, for each class a number of host pools is defined
- To all host pools "provider quotas" are assigned which quantify the available resources
- To all virtual machines "consumer quotas" are assigned which represent the value of the respective application
- To all virtual machines "priority quotas" are assigned
- Redundancy zones are defined, based on geographical and environment conditions, e.g. sites, buildings on sites, fire compartments inside buildings, etc. The crucial part in this definition is to consider the distance from the storage resources of such a redundancy zone which must not exceed the distance which allows synchronous replication as long as no function as described in "Geographical Data Redundancy in fully virtualized Data Centers" is deployed.
- Redundancy zones are sorted in a hierarchical structure, potentially with more than one redundancy zone on the same hierarchy level In case of resource losses are the following steps performed:

- First step is to check the ratio of local provider and consumer quota. In case there are free resources inside the same redundancy zone, the virtual servers running previously on the now unavailable resources are restarted there
- In case inside the same redundancy unit no resources are free, available resources on the same host pool located in different redundancy zones are checked for availability, where the resources of the host pool are evaluated in the order of hierarchy of the redundancy zone hosting them
- In case no resources in the local host pool are available, the consumer—provider quota relation is checked on all host pools with the same classification (all host pools which can serve as a failover target)
- In case no free resources of the required class are available, it is checked if the to be restarted resources have higher "priority quotas" as other locally running virtual servers
- In case no free resources are available, the "priority quotas" of the applications of all other host pools are compared, where the virtual servers of each host pool are evaluated in the order of hierarchy of the redundancy zone hosting them.

Provider Quotas are foreseen to norm the required resources. This abstraction is required e.g. because different versions of hardware providing different performance. Norms are used to e.g. prevent counting of tiny capacities over a huge number of servers which can in reality never be used as each part contributing to the overall capacity is too small for any virtual server. Priority quotas can be recalculated, e.g. in case a virtual server is hosting a database required by numerous other servers it will get higher quotas assigned, yet in case all these servers are down, the quota is recalculated. Based on this mechanism, the overall platform can rearrange the virtual servers for each situation and ensure that always the virtual servers prioritized highest are provided with resources while all usable resources are used.

Management System for Control Domains

The management system is composed of three components
- Component 1: Common or global management system, running in a virtual server on top of the platform
- Component 2: communication system distributing all configuration data over all control domains in the platform and ensuring consistency at any given point in time.
- Component 3: an infrastructural system of which one instance exists in each control domain and operates only on data and objects related to its own control domain. In certain cases, e.g. live migration or restart, this may include also cooperation with other control domains.

In this management architecture it is to be implemented:
- Common management system (component 1) requires some specific rules in order to cope with the fact that it is running on the same platform as the managed virtual servers
- Common management system needs to be able to integrate the control domain stored data in its data storage and access architecture (data abstraction)
- The infrastructural system has to be able to select and execute specific profiles, depending on environment triggers. Normal operation tasks will be executed by the management system (component 1), the infrastructural system will primarily act in cases of disaster, during reboot of the local control domain or parts of the platform (e.g. after failure of fire compartment or site) or in the wake of hardware faults. Examples for such rules are:
  - If the host boots and no other control domain can be contacted (handshake), just start all local infrastructure resources (e.g. TFTP servers, DHCP server, DNS server, storage server, etc) and wait for manual intervention by the operator
  - If the host boots and more than 50% of the servers can be contacted (handshake) and the local control domain is configured to run global management system (component 1) with the highest priority of all contacted nodes, start all infrastructure resources and start management system
  - In case the host boots and less than 50% of all other servers can be contacted (handshake) and the external interface of the other servers cannot be reached and the quorum devices of these servers are not reachable, start all infrastructure resources and the management system
  - In case the host boots and more than 90% of all other machines are available and the global management system is running, just boot the infrastructure resources and wait for the management system to make use of the control domains resources Geographical Data Redundancy in Fully Virtualized Data Centers In an embodiment, the present invention is aiming to provide data redundancy reached by replication over arbitrary distances. Replication over arbitrary distances is currently prevented by the fact that a running storage host causes changes in its storage at any given moment in time. Thus, replicating data to remote sites requires synchronous replication. This means that each storage status change is reported to the initiator, the storage host, only after the status change is committed by all replication instances. This decreases performance in case the distance to one or more replication instances causes increased signal round-trip-times. Thus, remote replication instances are only used in asynchronous mode, which means that the commits send by these instances are not used for committing status changes to the storage host itself. Usually logic is included in the middle layer, such as a file system able to handle snapshots and/or cow (copy-on-write).

In case a virtual machine is to be migrated to a distant host, there is no issue with regards to the virtual machine itself as migration is distant agnostic. The network has to be prepared for such an action, but there are several choices for that: layer two connectivity over all sites or BGP rerouting are the obvious choices for external interfaces. Yet, the storage has to be migrated in order to enable migration of the machine. This requires synchronous replication, as asynchronous replication would leave the machine with the storage tied to the original storage hardware.

The process to do a migration over arbitrary distances thus is as follows:
  Start migration of the storage in synchronous mode
  After storage is replicated, move the entry point of the machine to be migrated to the storage to the storage interface nearest to the migration's target hardware host
  In case storage status change rate (writes) is to high to keep the storage hosts performance, use "storage ballooning" (description see below)
  Start common live migration as implemented currently in virtualization technology
  As soon as migration is completed, switch off storage ballooning
  If IP connectivity redundancy scheme requires action, perform it as soon as migration is completed (e.g. BGP route change)

This procedure creates the following prerequisites and functions:
  Create and implement the concept of "sites" which based on area in which synchronous replication mode is possible based on actual signal round-trip-time in management systems of servers, storage and network
  If IP connectivity redundancy scheme requires certain prerequisites or intervention, both manual or automated, implement the required mechanisms and triggers
  Implement in the format layer of the storage resources, e.g. file system or block device, a configuration possibility which is dynamically reconfigurable to switch all objects inside the resources from synchronous to asynchronous replication mode
  Implement the actual replication mechanism, e.g. snapshots, copy-on-write, manipulation of inode table or any other suited technology
  Implement an algorithm which controls the switch from asynchronous to synchronous replication mode and back based on evaluation and projection of server load and storage load
  Implement algorithm to trigger the IP redundancy mechanism
  Implement "storage ballooning". In detail, control the scheduler of the virtualization solution or the resource manager (depending on virtualization mode) of the storage host from the same source as the replication of data (and subsequent migration) is controlled in order to be able to decrease the processor cycles (or resources in general) until the performance of storage replication is high enough to advance in replication even if the machine is using up all (temporarily) assigned resources Service Virtualization and Component Virtualization In order to create a fully dynamic offering, moving from Software as a Service (SaaS) to Virtual Server as a Service (VSaaS) to a yet undescribed offering "(virtual) Data Center as a Service" (vDCaaS), current technology has to be enhanced by a number of specific functions. A fully virtualized data center requires a number of objects, which have to be created and assigned to a customer by automated algorithms. These objects are the following:

1) Dedicated local network resources
  Dedicated network resources can be created by assigning VLAN and MPLS tunnels in a network to the connections of a specific customer, thus separating the customers' resources for his exclusive use and shield his traffic completely from any other customer. Standard Ethernet mechanisms, such as 802.1p extension and MPLS bandwidth management can be used to ensure availability of the assigned resources 2) Virtual servers
  They need to be created in a way that they are connected exclusively to the networks assigned to the customer. The control domain has to be enhanced in order to allow access to hardware resource relevant information (e.g. boot output) in way that customers are not interfering with each other and access of each customer is restricted to his own information. Hardware related operational processes have to be possible without interference with operational tasks of the customer, in specific tasks related to the virtual servers, thus hardware resources have to be independent from specific hosts (this can be implemented based on live migration features of virtualization technology).

3) Storage
  Storage resources have to be enabled for dynamic creation and resizing during operation in a way these changes do not interfere with availability or uptime of the virtual server to whom they are assigned. In the same way as virtual servers have to be independent and abstracted from the server hardware, storage resources have to be independent from specific hardware, paths and they have to be abstracted from operational processes related to storage and, if existing, storage networks. This can be, e.g., implemented on basis of iSCSI multipath, NPIV/FC or distributed block devices.

4) Management System Functionality
  The management system has to enable creation of all elements in the data center centrally as it has to maintain the configuration database out of one hand Management system multi-tenancy enabled
  The customer has to be able to identify physical location of machines (rack and host awareness) as well in order to assign virtual machines to hosts, sites, racks, etc according to the redundancy requirements of his applications.

5) Security settings
  Firewalls configured automatically in a way that the customer can control the flow of traffic to and from his systems, but not to others. The customer has to be able to identify physical location of machines (rack and host awareness) as well in order to build appropriate DMZ/MZ architectures 6) Dedicated backbone connections
  The backbone connections have to be accessible for the customer, who has to be able to configure all relevant routing tables.

The required implementations are
Ad 1):
  dynamically reconfigure control domains' network configurations
  create abstraction by use of virtual network bridges
  create a management system spanning dedicated network devices (hardware switches) as well as software elements hosted both on general purpose hardware (e.g. firewalls) and on virtualized hardware
  Enhance control domains to make full use of the parameter ranges enabled by network protocols (e.g. 4096 virtual LANs per Ethernet interface)
Ad 2):
  Enable control domains' and virtual servers' to migrate even with full range of network setting parameters in use
Ad 3):
  Enable storage to be accessed via network protocols
  Create storage which is independent from access path
Ad 4):
  create a multi-tenancy enabled management system, which is able to run inside a virtual server instance which is hosted on the platform which it is managing
In case the management system is running outside the platform, redundancy of the platform is linked to redundancy of the external platform, thus implementation of the external management platform requires solution of exactly the same problem as for the production platform. These problems are solved with the proposed architecture, thus the management system can be placed in a virtual platform and run on the highly available fault tolerant platform. To be considered is a set of simple rules, e.g. the management system should not shut down its own host.
  The platform has to be able to run without the management system
  The control domains have to be enabled to distribute configuration data
  The control platforms have to be enabled to evaluate configuration data
  The control platforms are required to manage the run status of all virtual platforms which are required to keep the management system up and running (in specific the storage stack and the virtual platforms the management system itself is running in)
  Create GUIs for all functionality in a way that average skilled operations staff can operate the platform and only troubleshooting requires expert knowledge
Ad 5):
  Build an algorithm to centrally manage all security relevant settings and check for consistency
  Derive connectivity matrix from configuration parameters of virtual servers and automatic translation into firewall rules which are updated dynamically
  Enable automatic updating of all security settings, regardless of the instance in an service interruption free way
  Manage all accounts centrally
  Update account information to virtual servers based on central repository (e.g. SVN interface to management system)
Ad 6):
  Manage backbone networks centrally
  Store backbone networks configuration data centrally
  Create interfaces to relevant equipment (e.g. MPLS route reflection server)

This set of features enables a customer to configure and order a full fletched data center without manual interaction on the provider side. All data can be entered in the corresponding GUIs and as soon as payment is guaranteed the customer can be informed, e.g. via mail or any other communication method about his access details (hostnames, usernames, passwords).

Provider—Customer Interface between Hardware and Operating System in Virtualized Environments In an embodiment, it is advantageously possible to create a customer-provider interface between hardware and operating system in order to enable advanced business models on hosting platforms, e.g. Virtual-Server-as-a-Service or Virtual-Data-Center-as-a-Service. Enhancement of interface is required as currently not all functions the customers need are sufficiently separated and secured against other customers and providers' functions and data.

Required functions:
  Console output visible for customers (but only of customers' instances)
  Resources visible, but only those assigned to the customer (e.g. hardware devices, etc)
  Access to control domain, but only in limited way ("SELinux-Dom0") in order to handle configuration files, console output etc, but without(!) the possibility to either execute uploaded files or execute other than the foreseen files
  Access to redundancy settings of virtual platforms (e.g. xen config files)
  Access to relevant repository branches in required mode (read-only or read-write mode) for required parameters (user names, passwords, etc). Consider read-only systems
  Access to resource management systems in case not instances created by the provider but "raw" resource chunks are provided
  Resource usage conditions implemented in management system (amount of virtual server instances which can be created, max. number of CPUs per instance, max. RAM per instance, amount of storage capacity, RAID level, number of logical volumes (with which RAID level), etc)

iSCSI Multipath as an Example for a Redundancy Mechanism

In an embodiment, it is advantageously possible to use iSCSI in a multipath configuration in which one iSCSI initiator writes over more than one (i.e. two) paths via two targets to one physical storage resource (i.e. a disk). In this configuration both paths are used in parallel, data is distributed to the paths in round-robin mode. In case one target, resource, device or any other component of one path fails, the path becomes unavailable. In this case the path is reported to be unavailable after the configurable timeout threshold. This configurable value constitutes a hard value for the timeout corresponding to the failover timeout in classical configurations. Unlike classical configurations, this value is deterministic as normal operation does not differ from operation in failure case. In fact, no actual failover happens as operation is resumed as normal with just one path out of use during the time of the failure.

In order to implement such a feature, the iSCSI target (the controller component) needs to have the following characteristics:
  It has to expose its resources by industry standard iSCSI
  It has to synchronize the status of all write commands between all paths In order to do that, all iSCSI discover and login events have to be propagated to all controllers All controllers need to be able to connect to all storage resources A storage resource must be mounted in a write lock enabled way Storage resources must provide the capability to be abstracted by standard mechanisms, e.g. 1 vm Storage resources must provide the capability to be secured against failure of one or more components, e.g. by using RAID1 systems or Reed-Solomon based replication All traffic on all external interfaces must provide the option to be encrypted All iSCSI functions must be available on the platform, but not necessarily on a specific interface Network layer mechanisms must be supported (e.g. VRRP, routing protocols, etc)

In an embodiment, synchronization of multiple iSCSI targets in active/active mode is possible.

Autonomy of Virtualized Instances

Basis of a cluster availability of hardware on which the cluster may execute. The more independent hardware elements are available, the higher the availability.

In case of virtualized environments, each node can be considered to be the member of a capacity resource pool, which includes all nodes to which the virtualized servers of the host can be migrated or on which they can be restarted. In this case virtual servers which are hosted on a host which has to be shut down can be migrated to another host running a migration compatible virtualization solution. In case the host is crashing, a management system logically superior to the control domain of the virtualized host can thus restart the virtual machine on any other virtualized host is has access to. It is not required for the management system to be hosted on specific hardware, it may as well be hosted on the virtualization platform itself. This operation is comparable to the tasks classical clusters have to perform on specific processes and thus does not take more time. This enables the management system to act as a single redundancy controller.

In order to be able to do that under all circumstances, the hosts have to fulfill certain requirements, which make them really autonomous from the perspective of the management system.

The objective is to make all dom0 autonomous working entities, which can start and perform independent from the degree of capacity reduction the platform experiences overall.

The requirement for autonomy can be broken down into the following set of features:

The usage of all data is restricted to the control domain space of the virtual data center, no other data is to be used, as in case of failure no external communication channel can be assumed to be functioning To run not only the host itself, but make its resources available for operation of the platforms virtual servers which are running the applications. This can mean starting specific servers as well as shutting virtual servers down. It may even mean to shut a server down in order to free resources to be used by another one which has higher priority.

All configuration data and parameters required for the host to run itself and to perform the management functions of its virtual servers are to be stored locally, most probably on physical devices attached to the host. The tasks to be performed may depend on the situation. E.g. may a host which is restarting after a failure and detecting that no external communication exists execute a rule to start the management system exclusively, while a host detecting fully functioning connections may starting virtual server in their order of priority until all available resources are consumed.

Local storage of data, which does not create dependencies between hosts creates the need for an automated versioning and distribution mechanism. In case a specific data element is changed, the corresponding changes have to be propagated to all hosts forming the platform. Thus this system needs to be a distributed system running on all hosts.

As changes may occur and can also be rolled back an automated versioning is required. The versioning system is as well required to run on all hosts in a distributed way.

In case execution of a certain set of configuration data fails, a roll back has to be implemented to the latest version known as functioning on this host. Thus a rollback mechanism has to be included, which works on each host independently. This can be realized by storing configuration on spare partitions, so the control domain can boot from the spare. Falling back to the original device is done by using volume manager stack.

In order to avoid interference with other scenarios, such as data changes on one host happening at a time another host is out of operation and thus unreachable for the automatic distribution mechanism, each host has to check at least after starting and depending on the action before executing the corresponding action, if the available version of data is the latest available one across the overall platform.

All data for all upper layers objects that are to be controlled from the host has to be on the platform. In case scenarios exist that require running virtual platforms on each server, each server needs to store all data. However, the data is to be checked prior to interpretation or execution if applicable to the corresponding host in the corresponding situation.

The requirement for local storage is not a functional requirement, yet a matter of experience. Provided a central storage exists, which provides the required availability, the hosts might use this as well and access the required data on this storage.

All rules have to be suited for local execution (no remote paths, data, input or triggers)

Configuration data may not consist of data only, but also include scripts which are executed on the host In case scripts are executed on the host, they have to provide a possibility to flag successful execution.

Redundant Distributed Block Devices

In an embodiment, it is advantageously possible to provide storage which can be operated completely independent from the operation of the servers using it. Such a solution would need to:

1) Allow multiple paths to any object
2) Update all status information synchronously to all redundancy units relevant for a certain object exposed to a host
3) Appear to the hosts using it as a normal physical device
4) Enable access by a network interface which is both industry standard and able to reroute (e.g. fibre channel, Posix compliant distributed file systems, or iSCSI)
5) It has to be transparent and abstracted from the formatting activities of the host, in specific, it must not pose any restrictions with regards to file systems or usage pattern
6) It has to distribute all data according to redundancy configuration 7) Redundancy configurations have to be able to consider restrictions of the underlying hardware and topology, e.g. creation of redundancy areas considering buildings, sites, power supply areas, etc.
8) It has to consider physical distance of machines ("rack awareness") in order to allow storage of data as close as possible to the user
9) It has to be able to configure the degree of redundancy separately for each object in a way that both the number of copies to be stored and the number of copies required for restoration of data can be configured separately (n:m redundancy)
10) It has to be able to run higher layer formats, in specific file systems, which are not restricted in the type of interface towards the host (POSIX)
11) It has to be able to run in a virtualized environment
12) It has to provide the capability to find each data sniplet from each entry point
13) It has to provide the capability to relocate each sniplet to each physical device
14) It has to provide self-controlling functionality in order to re-arrange sniplets in a way that makes optimal use of available physical storage capacity
15) It has to be able to configure synchronous or asynchronous
16) It has to consider transmission time delays in case of re-arranging or re-locating sniplets, while providing the capability for an "enforcement" of both modes even if not appropriate (e.g. in case synchronous mode is requested for copying active sniplets to a remote site, creating delays due to transmission delay, this can be required, however, to shift data in a way that follows the migration of a virtual machine)
17) In case of failures of one or more nodes have the remaining nodes to be able to resume operation seamlessly with the remaining nodes and data sniplets
18) Failure of a specific gateway shall not create any interruption in service, it merely leads to the fact that the failing node is deleted from the list of status synchronization targets
19) The system has to provide the capability to take new nodes added to the system in operation fully automatic and seamlessly for any other node (Added storage capacity is signalled to the system and subsequently used by the distributed algorithms which optimise capacity usage (copying of sniplets starts automatically), Redundancy Control in Virtualized Environments In an embodiment, it is advantageously possible to apply redundancy control aligned with virtualization in a fully virtualized environment.

Redundancy control has to be based on the control domain of the virtualization platform It is not acting on application specific processes, rather on virtual servers, i.e. it guarantees that one and only one instance of each virtual machine is running.

It is a single mechanism, implemented in a distributed way

It acts on data which is made available to the control domain, but it does not provide these data. Provisioning of these data would require a highly complex system, which is not only executing rules, but also aligned with overlying management functions It is invoked by the control domain's operating system process after boot is completed.

Integrity of data is ensured by an external mechanism

The system does not show any scalability limits, as it is able to provide redundancy on application server level without knowing specifics about processes, resources or their dependencies on application level.

Requirements for applications are restricted to the capability for being able to be restarted, in the same way as this is required by classical clusters. However, the mechanism does not require any cluster integration, no scripts or any other customization, as the objects are standardized all which is required can be done by means of configuration.

Online Simulation of Virtual Platforms

In an embodiment, it is advantageously possible to omit all steps currently employed in network planning and replace it by simulation of the virtualized environment. Compared to a non-virtual environment, which's simulation is a prohibitively complex task, virtualized environments can be simulated as their building blocks provide interfaces with strong abstraction of the underlying functions. Redundancy which is implemented in the classical way of tying resources and their spares together, requires in-depth knowledge of process architectures, network architecture and hardware resources. A fully virtualized platform behaves in a way that allows considering complex applications as being represented by the operating system process hosting them. Storage connected via iSCSI and abstracted by a suited protocol stack allows managing and thus simulating storage completely independent from server hardware.

The functions to be implemented in a management system are based on
  The data centers connectivity matrix
  Geographical dependency of resources (see "Resource and Redundancy Management in virtualized Environments")
  They include
  Check impact on virtual server/host/site/connection failure by evaluating impact on connectivity matrix
  Check impact on redundancy in case specific hardware resources are lost
  Check security by simulating propagation of viruses or malware, spread trajectories of intruders, etc
  Validate firewall settings
  Validate network traffic prioritization settings
  This requires
  matching of used IP network parameters (IP addresses, ports, host names)
  run load balancing mechanism of management system in "dry run" (switch off machines and check redistribution
  run routing protocols to detect failover routes in case of network errors
  Check load situations with regards to consumed server (processor and RAM consumption), network (switches, routers, hosts' hardware interfaces) and firewall resources Embodiments of the present invention will be described below with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Figure 1:
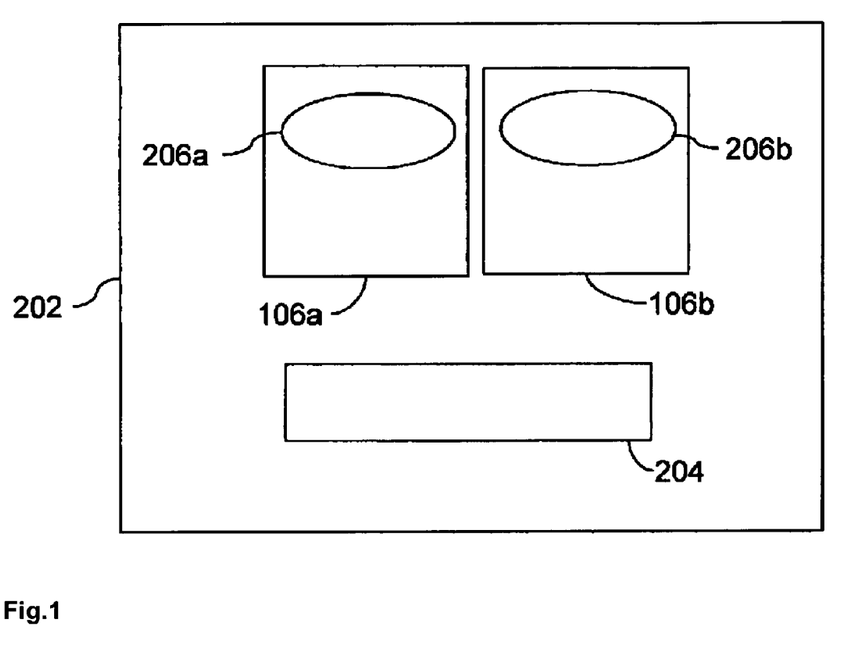
FIG. 1 is a block diagram illustrating a virtual instance in a physical node.

FIG. 1 is a block diagram illustrating virtual instances 106a, 106b in a physical node 202. The virtual instances 106a, 106b run in physical node 202. The physical node 202 may be a stand-alone server. The virtual instances 106a, 106b are controlled by a virtualization operating system 204 such as VMWare, Microsoft Virtual Server, Xen, and so forth. The virtual instances 106a, 106b further include agents 206a, 206b. The agents 206a, 206b are application programs that communicate with a controller to receive instructions from the controller for the virtual instances 106a, 106b, and act on directives issued by the controller. The agents 206a, 206b also report the status of the virtual instances 106a, 106b to the controller periodically. For example, the virtual instance 106a and the virtual instance 106b include the agent 206a and the agent 206b respectively.

Figure 2:
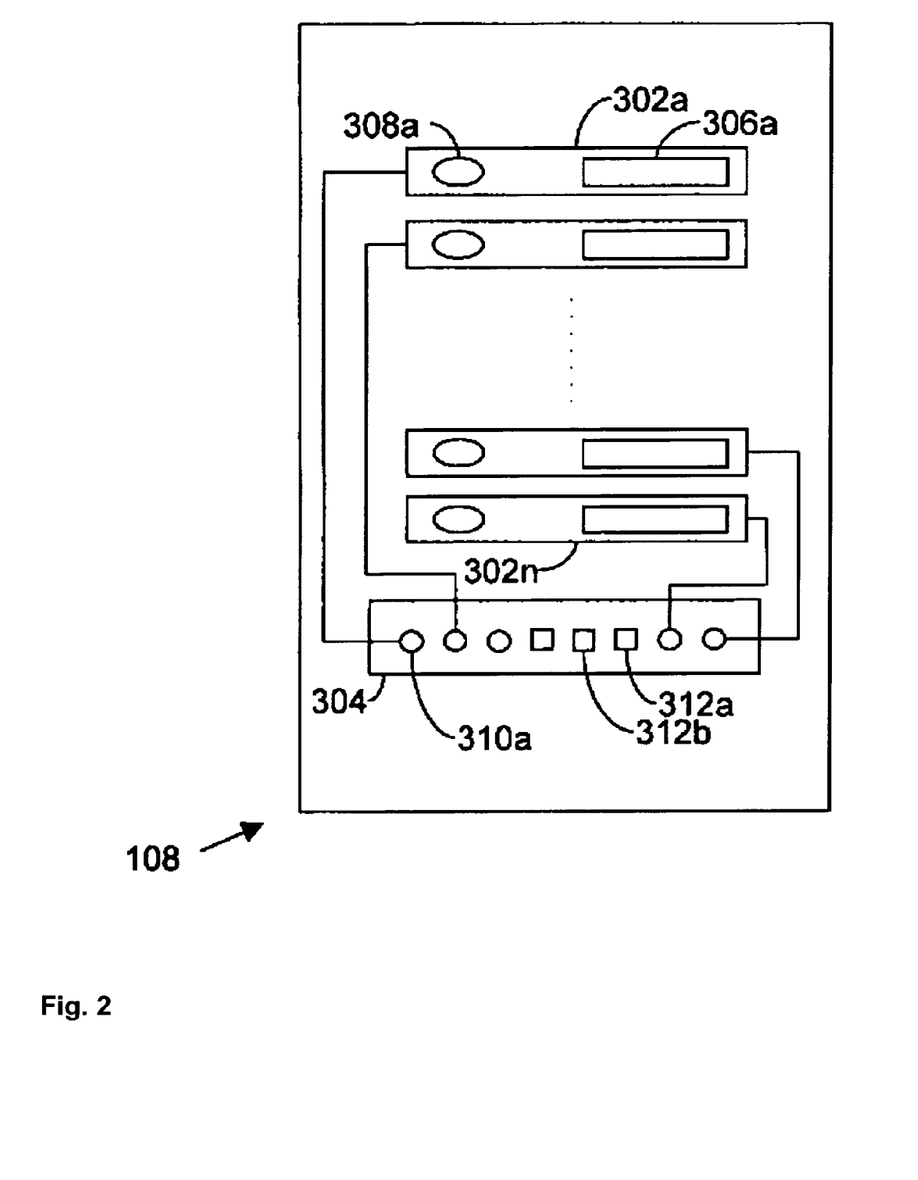
FIG. 2 is a block diagram illustrating a computer cluster in accordance with an embodiment of the invention.

FIG. 2 is a block diagram illustrating a computer cluster 108, in accordance with an embodiment of the invention. A plurality of stand-alone nodes 302a to 302n, hereinafter referred to as stand-alone nodes 302, may be organized in the computer cluster 108. Stand-alone node 302 may be defined as, but is not limited to, a server that has its own memory and processing attributes. Stand-alone node 302 of computer cluster 108 are e.g. connected to layer 2 interconnect fabric by means of the ports on a switch 304. The stand-alone servers 302 occupy the ports of the switch 304. Each stand-alone node 302 also includes a remote management Network Interface Card (NIC) 306 and an agent 308. For example, a stand-alone node 302a includes a remote management NIC 306a and an agent 308a. Further, switch 304 includes a plurality of ports 310 and a plurality of ports 312. Ports 312 are reserved for providing connectivity to external appliances. Ports 310 provide connectivity to each stand-alone node 302. For example, port 310a provides connectivity to stand-alone node 302a. Remote management NIC 306 connects stand-alone node 302 to a management system. The functionality of the agents 308 is similar to that of the agents 206. Agents 308 receive instructions from controller for stand-alone nodes 302, and act on directives issued by the controller.

Figure 3:
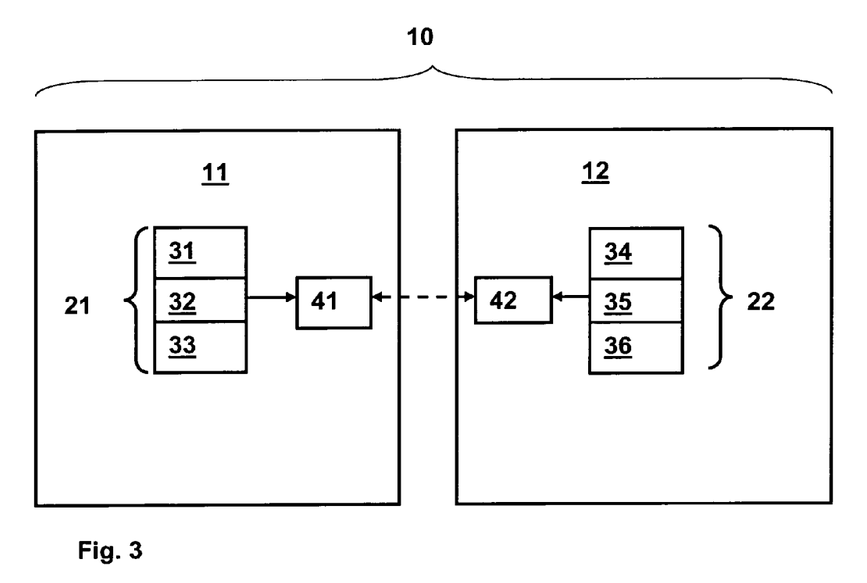
FIG. 3 depicts schematically a computer cluster in accordance with a further embodiment of the invention.

FIG. 3 depicts schematically a computer cluster 10 according to a further exemplary embodiment of the present invention. The computer cluster 10 includes a first compartment 11 and a second compartment 12. The first compartment 11 includes a plurality of first physical nodes 21. Each first physical node 21 includes a first partition 31, a second partition 32 and a third partition 33. The second partition 32 provides resources for a first infrastructural virtual instance 41. The second compartment 12 includes a plurality of second physical nodes 22. Each second physical node 22 includes a fourth partition 34, a fifth partition 35 and a sixth partition 36. The fifth partition 35 provides resources for a second infrastructural virtual instance 42. The first infrastructural virtual instance 41 and the second infrastructural virtual instance 42 are configured for monitoring each other. The plurality of third partitions 33 and the first infrastructural virtual instance 41 are connected in a first storage network and the plurality of sixth partitions 36 and the second infrastructural virtual instance 42 are connected in a second storage network. These storage networks preferably include iSCSI networks or networks using TCP/IP. Preferably the plurality of second partitions 32 are connected in a RAID1 system and the plurality of fifth partitions 35 are connected in a further RAID1 system. The second resources and the fourth resources are preferably provided for telecommunication applications. The first infrastructural virtual instance 41 and the second infrastructural virtual instance 42 provide disaster recovery means, wherein preferably the first infrastructural virtual instance 41 and the second infrastructural virtual instance 42 are connected in a master-slave configuration, i.e. in case that both the first infrastructural virtual instance 41 and the second infrastructural virtual instance 42 are operational, one of the first infrastructural virtual instance 41 and the second infrastructural virtual instance 42 acts as a master virtual device and the other acts as a slave virtual device, and in case that the master virtual device fails the slave virtual device becomes the master, and in case that only one of the first infrastructural virtual instance 41 and the second infrastructural virtual instance 42 is operational, then the operational infrastructural virtual instance is the master virtual device and the other infrastructural virtual instance is activated and becomes the slave virtual device.

The invention claimed is:

1. A computer cluster, comprising:
a first compartment comprising a plurality of first physical nodes configured to provide first resources for a first infrastructural virtual instance and second resources for guest virtual instances, each of the plurality of first physical nodes comprising a first mass storage device, the first mass storage device comprising:
a first partition provided for booting the first physical node;
a second partition as part of the first resources assigned to the first infrastructural virtual instance; and
a third partition as part of the second resources; and
a second compartment comprising a plurality of second physical nodes configured to provide third resources for a second infrastructural virtual instance and fourth resources for guest virtual instances, each of the plurality of second physical nodes comprising a second mass storage device, the second mass storage device comprising:
a fourth partition provided for booting the second physical node;
a fifth partition as part of the third resources assigned to the second infrastructural virtual instance; and
a sixth partition as part of the fourth resources;
wherein the first infrastructural virtual instance and the second infrastructural virtual instance are configured for monitoring each other and for finding each data sniplet of a data object from each entry point based on labeling each data sniplet with an identifier, the identifier including information for linking the data sniplet to other data sniplets for recreation of the data object as a multiple linked list;
wherein the plurality of the first physical nodes and the plurality of second physical nodes are configured to, when a node uses an amount of its resources exceeding a threshold amount, relocate and relabel the data sniplets of the data object based on transmission time delays, wherein the transmission time delays are based on round trip time measurements corresponding to the data sniplets.

2. The computer cluster according to claim 1, wherein the plurality of third partitions and the first infrastructural virtual instance are connected in a first storage network, and wherein the plurality of sixth partitions and the second infrastructural virtual instance are connected in a second storage network.

3. The computer cluster according to claim 1,
wherein the first compartment comprises a first militarized zone and a first demilitarized zone, and the second compartment comprises a second militarized zone and a second demilitarized zone;

wherein in the first militarized zone only a restricted data exchange compared to the first demilitarized zone is allowed;

wherein in the second militarized zone only a restricted data exchange compared to the second demilitarized zone is allowed;

wherein each first physical node in the first militarized zone comprises a seventh partition as part of fifth resources for a first administrative virtual instance; and wherein each second physical node in the second militarized zone comprises an eighth partition as part of sixth resources for a second administrative virtual instance.

4. The computer cluster according to claim 1, wherein the plurality of second partitions are connected in a RAID1 system and the plurality of fifth partitions are connected in a further RAID1 system.

5. The computer cluster according to claim 1, wherein the second resources and the fourth resources are provided for at least one telecommunication application.

6. The computer cluster according to claim 1, wherein the first infrastructural virtual instance and the second infrastructural virtual instance provide for disaster recovery.

7. The computer cluster according to claim 1, further comprising:
a third compartment, further comprising a plurality of third physical nodes configured to provide seventh resources for a third infrastructural virtual instance and eighth resources for guest virtual instances; and
a fourth compartment, further comprising a plurality of fourth physical nodes configured to provide ninth resources for a fourth infrastructural virtual instance and tenth resources for guest virtual instances;
wherein the third infrastructural virtual instance and the fourth infrastructural virtual instance are configured for monitoring each other.

8. The computer cluster according to claim 1, wherein
one of the first infrastructural virtual instance and the second infrastructural virtual instance is configured to act as a master virtual instance with the other of the first infrastructural virtual instance and the second infrastructural virtual instance being configured to act as a slave virtual instance when both the first infrastructural virtual instance and the second infrastructural virtual instance are operational, and the slave virtual instance is configured to become the master virtual instance if the master virtual instance fails; and
at least one of the first infrastructural virtual instance and the second infrastructural virtual instance is configured to act as a master virtual instance with the other of the first infrastructural virtual instance and the second infrastructural virtual instances being configured to be activated and act as a slave virtual instance when only one of the first infrastructural virtual instance and the second infrastructural instance is operational.

9. The computer cluster according to claim 3, wherein
one of the first administrative virtual instance and the second administrative virtual instance is configured to act as a master virtual instance with the other of the first administrative virtual instance and the second administrative virtual instance being configured to act as a slave virtual instance when both the first administrative virtual instance and the second administrative virtual instance are operational, and the slave virtual instance is configured to become the master virtual instance if the master virtual instance fails; and
at least one of the first administrative virtual instance and the second administrative virtual instance is configured to act as a master virtual instance with the other of the first administrative virtual instance and the second administrative virtual instances being configured to be activated and act as a slave virtual instance when only one of the first administrative virtual instance and the second administrative instance is operational.

10. A method for providing disaster recovery functionality for a computer cluster, the method comprising:
operating at least one of a first infrastructural virtual instance and a second infrastructural virtual instance, wherein the first infrastructural virtual instance corresponds to a first compartment of the computer cluster and comprises a plurality of first physical nodes configured to provide first resources for a first infrastructural virtual instance, and wherein the second infrastructural virtual instance corresponds to a second compartment of the computer cluster and comprises a plurality of second physical nodes configured to provide third resources for a second infrastructural virtual instance; and
when both the first infrastructural virtual instance and the second infrastructural virtual instance are operational:
operating one of the first infrastructural virtual instance and the second infrastructural virtual instance as a master virtual instance; and
operating the other of the first infrastructural virtual instance and the second infrastructural virtual instance as a slave virtual instance; and
if the master virtual instance fails, operating the slave virtual instance as the master virtual instance;
when only one of the first infrastructural virtual instance and the second infrastructural instance is operational:
operating the operational infrastructural virtual instance as a master virtual instance;
activating the other infrastructural virtual instance; and
operating the other infrastructural virtual instance as a slave virtual instance;
wherein the first infrastructural virtual instance and the second infrastructural virtual instance are configured for monitoring each other and for finding each data sniplet of a data object from each entry point based on labeling each data sniplet with an identifier, the identifier including information for linking the data sniplet to other data sniplets for recreation of the data object as a multiple linked list;
wherein the method further comprises: when a node uses an amount of its resources exceeding a threshold amount, relocating and relabeling, by the plurality of the first physical nodes and the plurality of second physical nodes, the data sniplets of the data object based on transmission time delays, wherein the transmission time delays are based on round trip time measurements corresponding to the data sniplets.

11. The method according to claim 10, wherein:
the first compartment comprises a first militarized zone and a first demilitarized zone, and the second compartment comprises a second militarized zone and a second demilitarized zone;
in the first militarized zone only a restricted data exchange compared to the first demilitarized zone is allowed;
in the second militarized zone only a restricted data exchange compared to the second demilitarized zone is allowed;
each first physical node in the first militarized zone comprises a seventh partition as part of fifth resources for a first administrative virtual instance; and
each second physical node in the second militarized zone comprises an eighth partition as part of sixth resources for a second administrative virtual instance.

* * * * *